(12) United States Patent
Song et al.

(10) Patent No.: US 8,706,739 B1
(45) Date of Patent: Apr. 22, 2014

(54) JOINING USER PROFILES ACROSS ONLINE SOCIAL NETWORKS

(75) Inventors: Han See Song, San Jose, CA (US); Antonio Nucci, San Jose, CA (US); Qiang Ma, Highland Park, NJ (US)

(73) Assignee: Narus, Inc., Sunnyvale, CA (US)

( * ) Notice: Subject to any disclaimer, the term of this patent is extended or adjusted under 35 U.S.C. 154(b) by 76 days.

(21) Appl. No.: 13/457,018

(22) Filed: Apr. 26, 2012

(51) Int. Cl.
*G06F 17/30* (2006.01)

(52) U.S. Cl.
USPC .......................................................... 707/748

(58) Field of Classification Search
USPC ................................................. 707/747, 748
See application file for complete search history.

(56) References Cited

U.S. PATENT DOCUMENTS

| | | | | |
|---|---|---|---|---|
| 5,875,285 | A * | 2/1999 | Chang | 706/53 |
| 2008/0209340 | A1* | 8/2008 | Tonse et al. | 715/745 |
| 2009/0087036 | A1* | 4/2009 | Imaoka | 382/118 |
| 2009/0164464 | A1* | 6/2009 | Carrico et al. | 707/5 |
| 2009/0327438 | A1* | 12/2009 | Cheng et al. | 709/206 |
| 2010/0180337 | A1* | 7/2010 | Bajekal | 726/19 |
| 2011/0145050 | A1* | 6/2011 | Gross et al. | 705/14.25 |
| 2011/0153644 | A1* | 6/2011 | Kosuru et al. | 707/769 |
| 2011/0276480 | A1* | 11/2011 | Tunguz-Zawislak et al. | 705/40 |
| 2012/0209735 | A1* | 8/2012 | Subramanian et al. | 705/26.1 |

OTHER PUBLICATIONS

Raad, E., et al., "User Profile Matching in Social Networks", International Conference on Network-Based Information Systems, pp. 297-304, Washington, DC, USA, 2010.
Motoyama, M., "I Seek You: Searching and Matching Individuals in Social Networks", WIDM, pp. 67-75, New York, NY, USA, 2009. ACM.
Chandel, A., et al., "Benchmarking Declarative Approximate Selection Predicates", ACM SIGMOD, pp. 353-364, New York, NY, USA, 2007.
Cohen, W., et al., "A Comparison of String Metrics for Matching Names and Records", International Joint Conference on Artificial Intelligence (IJCAI), 2003.
Hadjieleftheriou, M., "Weighted Set-Based String Similarity", IEEE Data Engineering Bulletin, 2010.

* cited by examiner

*Primary Examiner* — Cam Truong
(74) *Attorney, Agent, or Firm* — Fernandez & Associates, LLP

(57) ABSTRACT

A method for user profile matching, including extracting online social network (OSN) user profile tokens from user profiles of one or more OSNs, generate indexes each referencing a user by at least one of the OSN user profile tokens that is associated with the user, extracting target OSN user profile tokens from a target OSN user profile of the one or more OSNs, identifying a candidate user based on the target OSN user profile tokens and at least one of the indexes, calculating a score representing a similarity measure between a candidate OSN user profile selected from the OSN user profiles that belongs to the candidate user and the target OSN user profile of the target user, and storing, in response to the score exceeding a pre-determined threshold, a combination of the target OSN user profile and the candidate OSN user profile as an expanded profile of the target user.

15 Claims, 5 Drawing Sheets

JOINING USER PROFILES ACROSS ONLINE SOCIAL NETWORKS

BACKGROUND OF THE INVENTION

1. Field of the Invention

The present invention relates to computers and computer networks. More particularly, the invention relates to analyze user activities in online social networks (OSNs).

2. Background of the Related Art

A social network is a social structure (e.g., community) made of members (e.g., a person) connected by social relationships such as friendship, kinship, relationships of beliefs, knowledge, prestige, culture, etc. Members of a social network often share interests and activities relating to such social relationships. For example, individual computers linked electronically could form the basis of computer mediated social interaction and networking within a social network community, referred to as an online social network (OSN). A social network service focuses on building online communities of people who share interests and/or activities, or who are interested in exploring the interests and activities of others. Most social network services are web based and provide a variety of ways (e.g., e-mail, instant messaging service, etc.) for users (or members) to interact socially.

Matching profiles of users across OSNs is a problem of great interest. Generally, only partial user profile information is available in a single OSN. Via the profile information overlap between different OSNs, profiles belonging to the same user can be concatenated to present a more complete profile, which can benefit personalize marketing, user online behavior analysis, etc. A number of previous works assess the feasibility of matching profiles across OSNs. These methods typically require large man/machine-hour to be practical or are restrictive in looking for matches. As a result, the growing size of today's information networks poses a scalability challenge to the schemes analyzing them. While the general similarity and distance measures such as edit distance and n-gram provides simple and clear ways to parse out the textual information for a small number of user profiles, the growing amount of string comparisons on networks with millions of profiles becomes a limiting factor for these methods. Further, even if the comparisons can be carried out somehow, the non-contextual, blind comparison leads to poor profile matching accuracy. For example, a comparison between user names, "Mary" and "Mark", are considered very similar under edit distance measure while "Bill" and "William" are not.

SUMMARY

In general, in one aspect, the present invention relates to a method for user profile matching in one or more online social networks (OSNs). The method includes extracting OSN user profile tokens from a plurality of OSN user profiles of a first OSN among the one or more OSNs, wherein the plurality of OSN user profiles belong to a plurality of users of the first OSN and contain personal information of the plurality of users, generating, by a computer processor, a plurality of indexes each referencing a user of the plurality of users by at least one of the OSN user profile tokens that is associated with the user, extracting target OSN user profile tokens from a target OSN user profile of a target user of the one or more OSNs, identifying, by the computer processor, a candidate user from the plurality of users based on the target OSN user profile tokens and at least one of the plurality of indexes, calculating, by the computer processor, a score representing a similarity measure between a candidate OSN user profile selected from the plurality of OSN user profiles that belongs to the candidate user and the target OSN user profile of the target user, and storing, in response to the score exceeding a pre-determined threshold, a combination of the target OSN user profile and the candidate OSN user profile as an expanded profile of the target user.

Other aspects and advantages of the invention will be apparent from the following description and the appended claims.

DETAILED DESCRIPTION

Figure 1:
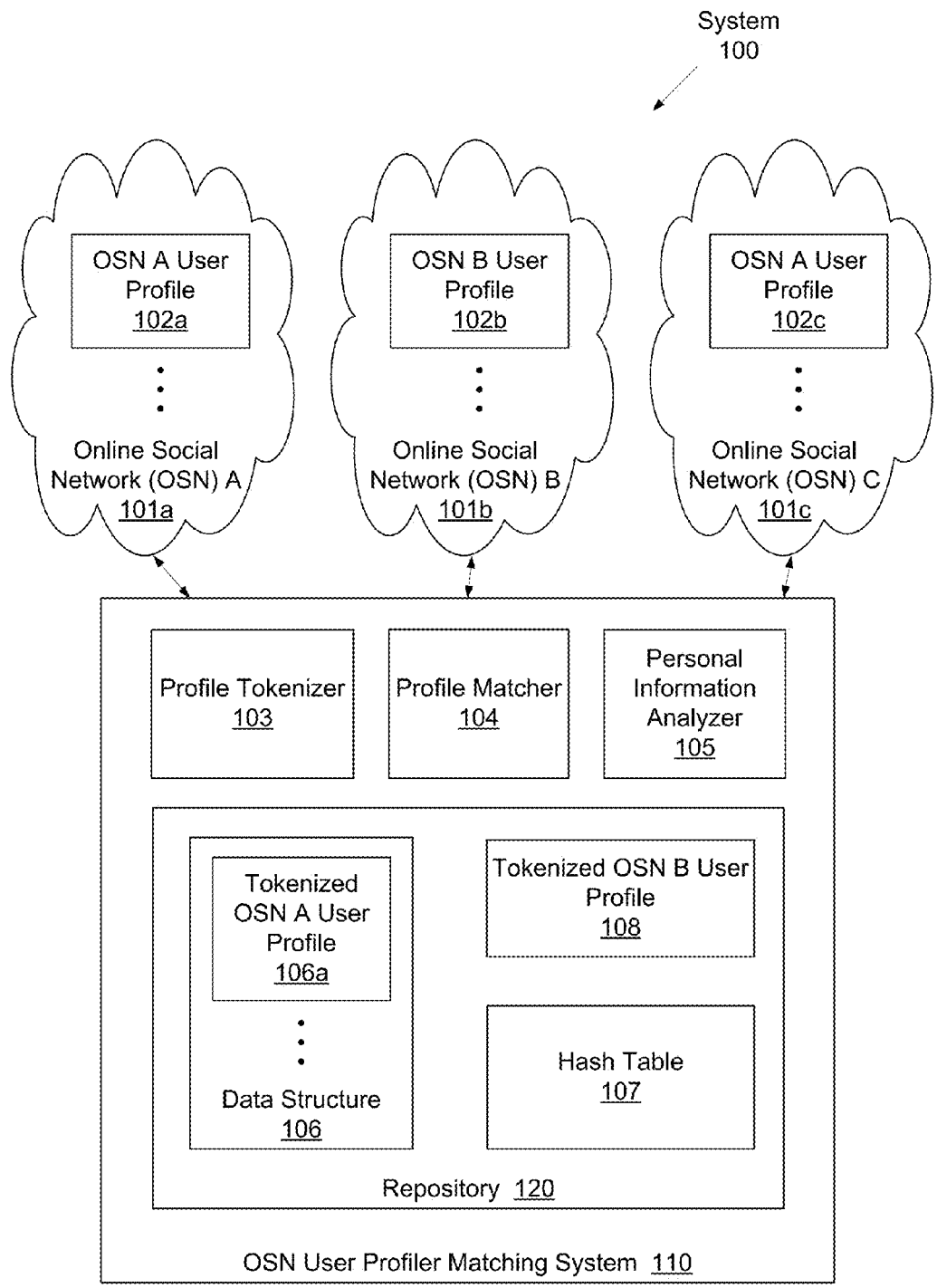
FIG. 1 shows a system block diagram according to aspects of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

Embodiments of the invention provide a system and method to match user profiles in one or more OSNs (e.g., a pair of OSNs). Throughout this disclosure, the terms "OSN user profile", "user profile", and "profile" may be used interchangeably depending on the context. Once matched, the user profiles are joined, referred to as splicing or pair-wise profile joining. In one or more embodiments, the match and the pair-wise profile joining are further based on a user profile of a third OSN, referred to as the middle-man. In one or more embodiments, attributes of the user profiles (e.g., screen name, email address, first and last name, age, gender, residence address, birth date, etc.) are tokenized and hashed for efficient comparison.

FIG. 1 shows a system block diagram of a system (100) in accordance with one or more embodiments of the invention. Those skilled in the art, having the benefit of this detailed description, will appreciate the components shown in FIG. 1 may differ among embodiments of the invention, and that one or more of the components may be optional. Although specific numbers of components are shown in FIG. 1, different number of each component may be included. In one or more embodiments of the invention, one or more of the components shown in FIG. 1 may be omitted, repeated, supplemented, and/or otherwise modified from that shown in FIG. 1. Accordingly, the specific arrangement of components shown in FIG. 1 should not be construed as limiting the scope of the invention.

A shown in FIG. 1, the system (100) includes OSN A through C (101a, 101b, 101c) where each OSN includes multiple user profiles (e.g., OSN A user profile (102a), OSN B user profile (102b), OSN C user profile (102c), etc.) of respective OSN users (not shown), an OSN user profile matching system (110) having a profile tokenizer (103), a profile matcher (104), a personal information analyzer (105), and a repository (120) storing data structure (106) of OSN user profiles (e.g., stored as tokenized OSN A user profile (106a), etc.), a hash table (107), and a tokenized OSN user profile (108) needing to be matched. Each of these OSN A through C (101a, 101b, 101c) may be based on wired/wireless portions of local area network, wide area network, Internet, and/or other computer and communication networks.

As noted above, the OSN user profile matching system (110) is configured to perform user profile matching across one or more OSNs (e.g., OSN A through C (101a, 101b, 101c)). The user profiles may be obtained either by using the OSN specific API to query public profiles or by crawling and parsing publicly accessible profile pages. In one or more embodiments, the OSN user profile matching system (110) is configured to obtain multiple OSN user profiles (e.g., OSN A user profile (102a), OSN B user profile (102b), OSN C user profile (102c), etc.) from each of the one or more OSNs and to organize these user profiles in data structures (e.g., the data structure (106) and associated hash table (107)) to facilitate the matching. For example, the OSN B user profile (102b) of the OSN B (101b) may be compared to the data structure (106) storing information of multiple user profiles (e.g., the tokenized OSN A user profile (106a), etc.) of the OSN A (101a) with the help of the hash table (107) associated with the data structure (106). In this example context, the multiple OSN A user profiles are said to belong to candidate users of the OSN A (101a) while the OSN B user profile (102b), referred to as a target user profile, is said to belong to a target user. The target user and a candidate user selected from these candidate users, based on a match found by the comparison, are then identified as being equivalent to each other. In another example, the OSN A (101a) and the OSN B (101b) may be the same OSN.

In one or more embodiments, the OSN user profile matching system (110) includes the profile tokenizer (103) that is configured to extract OSN user profile tokens from multiple OSN user profiles (e.g., the OSN A user profile (102a), etc. of the OSN A (101a)). In particular, these OSN user profiles belong to multiple users (referred to as candidate users, such as a candidate user having the OSN A user profile (102a)) of the OSN (e.g., the OSN A (101a)) and contain personal information of these candidate users. In one or more embodiments, these OSN user profiles are stored in the data structure (106), for example in a tokenized format such as the tokenized OSN A user profile (106a). In other examples, these OSN user profiles may also be stored in other formats. In one or more embodiments, each attribute (e.g., name, birth date, email address, home address, etc.) of each OSN user profile is analyzed using pre-determined de-limiters to extract these OSN user profile tokens. In one or more embodiments, one or more of special character (also referred to as a symbol, such as any character that is neither an alphabet nor a numeral), space, and alphabet/numeral transition (i.e., alphabet to numeric and/or numeric to alphabet) is used as the de-limiters. For example, OSN profile tokens "william", "1953", "gmail", "com", "8", "23", and "1953" may be extracted from the email address "william1953@gmail.com" and the birth date "Aug. 23, 1953" in a user profile of a user "William" in the OSN A (101a). In addition, OSN profile tokens "no", "1953", "3", "rd", and "street" may be extracted from the home address "no. 1953, 3rd street" in another user profile of a user "Mary" in the OSN A (101a). Accordingly, all these user profile tokens "william", "1953", "gmail", "com", "8", "23", "no", "3", "rd", and "street" are stored in the data structure (106). In one or more embodiments, common tokens (e.g., gmail, com, no, rd, street, etc.) may be eliminated from the data structure (106). For example, the extracted OSN profile tokens may be filtered using a pre-defined list of common tokens before stored in the data structure (106).

In one or more embodiments, the profile tokenizer (103) is further configured to generate a number of indexes each referencing one of the aforementioned candidate users by at least one of the aforementioned OSN user profile tokens. Specifically, at least one of the OSN user profile tokens is extracted from the OSN user profile that belongs to the referenced candidate user. In one or more embodiments, these indexes are stored in the hash table (107) having OSN user profile tokens as keys for looking up corresponding candidate users. In the context above, at least one of the OSN user profile tokens is used as a key of the hash table (107) to reference a value identifying the candidate user in the hash table (107) who has a OSN user profile from which the at least one of the OSN user profile tokens is extracted. Continuing with the example above, the hash table (107) returns the user "William" when the user profile tokens "william", "gmail", "com", "8", and "23", are used as keys, returns the user "Mary" when the user profile tokens "no", "3", "rd", and "street" are used as keys, and returns both "William" and "Mary" when the user profile token "1953" is used as the key.

Based on the data structure (106) populated with tokenized OSN profiles of the OSN A (101a) and the hash table (107) populated for reverse looking up of candidate users of the OSN A (101a) using user profile tokens as keys, a user profile (referred to as a target user profile, that can be either for the same OSN A (101a) or for a different OSN, such as the OSN B (101b)) can be compared to all available user profiles of the OSN A (101a) in the data structure (106) by comparing user profile tokens in the following manner. In one or more embodiments, the profile tokenizer (103) is configured to extract target OSN user profile tokens from the target user profile, such as the OSN B user profile (102b) of the OSN B (101b) to form the tokenized OSN B user profile (108). Accordingly, the OSN B user profile (102b) is compared to the OSN A user profile (102a) and other OSN A user profiles of the OSN A (101a) by comparing user profile tokens in the tokenized OSN B user profile (108) to user profile tokens in the data structure (106). For example, the tokenized OSN B user profile (108) may include the user profile tokens "bill", "1953", "yahoo", and "com" extracted from the email address "bill1953@yahoo.com" in the OSN B user profile (102b).

In one or more embodiments, the profile tokenizer is configured to selectively augment the tokenized OSN B user profile (108) with a semantically equivalent addition before the comparison. In one or more embodiments, the profile tokenizer is configured to selectively augment each of the tokenized OSN A user profiles (e.g., the tokenized OSN A user profile (106a)) with a semantically equivalent addition before the comparison. For example, the profile token "William" may be augmented by an additional profile token "Bill" and vice versa. In particular, these augmented tokenized OSN A user profiles are stored in the data structure (106) that is partitioned based on the candidate users of the OSN A (101a).

In one or more embodiments, the OSN user profile matching system (110) includes the profile matcher (104) that is configured to perform the aforementioned user profile token comparison by first identifying at least one of the candidate users of the OSN A (101a) based on the tokenized OSN B user profile (108) and at least one of the of indexes in the hash table (107). For example, each profile token of the tokenized OSN B user profile (108) is used as a key in an attempt to look up any candidate user referenced by at least one index in the hash table (107). If no candidate user can be found in the hash table (107) using all of the profile tokens of the tokenized OSN B user profile (108) as the keys, the OSN B user profile (102b) is said to be not matching any of the available user profiles of the OSN A (101a) and no more comparison is performed to conserve computing resources. If a candidate user is found in the hash table (107) using at least one profile token of the tokenized OSN B user profile (108) as the key, this candidate user of the OSN A (101a) is selected and considered as potentially associated with the OSN B user profile (102b). Accordingly, any further comparison is limited to only information associated with this selected candidate user. In one or more embodiments, more than one candidate user may be selected and any further comparison is limited to only information associated with these selected candidate users. For example, only those profile tokens associated with the selected candidate user(s) are included in any further comparison to conserve computing resources. In one or more embodiments, certain user profile tokens (e.g., "gmail", "yahoo", "com", etc.) commonly found in most of users' profiles are not used for user profile matching. For example, the user profile tokens "gmail", "yahoo", "com", etc. are ignored when selecting the candidate user. Continuing with the example above, the users "William" and "Mary" are both selected as the candidate users when user profile token "1953" of the tokenized OSN B user profile (108) is used as a key to look up the candidate user in the hash table (107).

In one or more embodiments, the profile matcher (104) is further configured to calculate a score representing a similarity measure between a user profile of the OSN A (101a) that belongs to the selected candidate user and the target user profile, e.g., OSN B user profile (102b) of the OSN B (101b). If the score is less than a pre-determined threshold, no match is said to be found between the OSN B user profile (102b) of the OSN B (101b) and any available user profile of the OSN A (101a) and no more comparison is performed to conserve computing resources. If the score exceeds the pre-determined threshold, the user profile of the OSN A (101a) that belongs to the selected candidate user and the OSN B user profile (102b) of the OSN B (101b) are combined and stored as an expanded profile of the target user. In this case, the selected candidate user is considered as equivalent to the target user. Said in other words, the target user and the selected candidate user are considered as having the same identity and are the same physical person. In one or more embodiments, the score is calculated based on a result of pair-wise comparison of all user profile tokens in the tokenized OSN B user profile (108) against all user profile tokens in a tokenized OSN user profile (e.g., the tokenized OSN A user profile (106a)) that is associated with the selected candidate user in the data structure (106). For example, the score may be proportional to a number of matching user profile token pairs found in the pair-wise comparisons. Continuing with the example above, the score of similarity between the user profile of "William" and tokenized OSN B user profile (108) is 1 based on the matching user profile token "1953." Similarly, the score of similarity between the user profile of "Mary" and tokenized OSN B user profile (108) is also 1 based on the matching user profile token "1953." However, when the tokenized OSN A user profiles in the data structure (106) are augmented with semantically equivalent tokens "william" and "bill", the score of similarity between the user profile of "William" and tokenized OSN B user profile (108) is increased to 2 based on the matching user profile tokens "1953" and "william" equaling "bill." Accordingly, by properly setting the score threshold at 1.5, the tokenized OSN B user profile (108) is joined with the user profile of "William" instead of user profile of "Mary."

To further conserving the computing resources for performing the comparisons, the data structure (106) is further partitioned based on one or more of a class, a type, and a length of the OSN user profile tokens such that the aforementioned pair-wise comparisons are limited to comparing only a pair of OSN user profile tokens both belonging to the same class, the same type, and/or the same length of OSN user profile tokens. In one or more embodiments, the class includes a key attribute class, a derivable attribute class, and a statistical attribute class, and the type includes an alphabetic type and a numeric type. Examples of the key attribute class, derivable attribute class, statistical attribute class, alphabetic type, and numeric type are described in reference to FIGS. 3A and 3B below.

In one or more embodiments, the OSN user profile matching system (110) includes the personal information analyzer (105) that is configured to analyze the expanded profile to generate a personal information report of the target user. While each of the OSN user profiles making up the expanded profile may concentrate on one aspect of the OSN activities of the target user, the combination of these aspects reflected in the expanded profile allows a more comprehensive personal information report of the target user to be generated.

Figure 2:
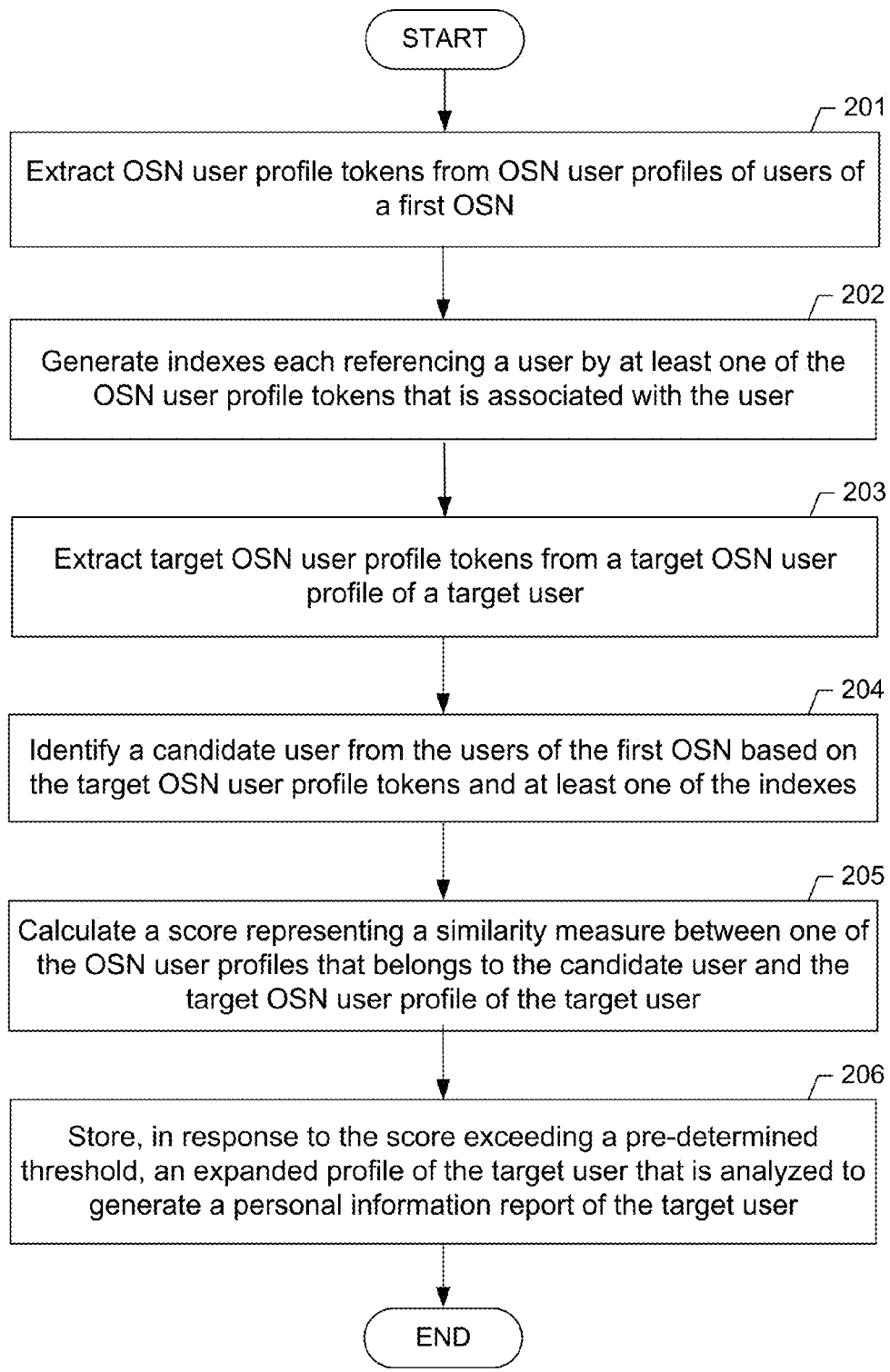
FIG. 2 shows a flowchart of a method according to aspects of the invention.

FIG. 2 depicts a flowchart of a method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2. In one or more embodiments of the invention, the method depicted in FIG. 2 may be practiced using system (100) described with respect to FIG. 1 above.

Initially in Step 201, OSN user profile tokens are extracted from OSN user profiles of a first OSN, where the OSN user profiles (generally referred to as candidate user profiles) belong to users (generally referred to as candidate users) of the first OSN and contain personal information of the candidate users. For example, the first OSN corresponds to the OSN A (101) shown in FIG. 1. In one or more embodiments, attributes of each OSN user profile are identified based on pre-determined user profile schema of the first OSN such that OSN user profile tokens are extracted from each attribute of each OSN user profile based on pre-determined parsing rules. Examples of OSN user profile attributes and token parsing rules are described in at least FIG. 3A and various tables of this disclosure.

In one or more embodiments, the OSN user profile tokens are selectively augmented with a semantically equivalent addition, which are stored together in a data structure that is partitioned based on the candidate users. For example, the data structure corresponds to the data structure (106) shown in FIG. 1. In one or more embodiments, the data structure is further partitioned based on a class, a type, and/or a length of the OSN user profile tokens. In one or more embodiments, the class may be a key attribute class, a derivable attribute class, or a statistical attribute class, and the type may be an alphabetic type or a numeric type. Examples of extracting profile tokens, supplementing them with semantically equivalent additions, and organizing them in the data structure are described in reference to FIGS. 3A and 3B below.

In Step 202, indexes are generated with each index referencing a candidate user by at least one of the OSN user profile tokens that is/are associated with the candidate user. In particular, the at least one of the OSN user profile tokens is/are extracted from an OSN user profile that belongs to the candidate user. In one or more embodiments, the indexes are stored in a hash table such that an OSN user profile token can be used as a key of the hash table to reference a value identifying an associated candidate user in the hash table. For example, the hash table corresponds to the hash table (107) shown in FIG. 1. Examples of generating and using the hash table are described in reference to FIGS. 3A and 3B below.

In Step 203, target user profile tokens are extracted from a target OSN user profile. In one or more embodiments, the target OSN user profile is for the first OSN, i.e., the same OSN based on which the hash table is constructed. In one or more embodiments, the target OSN user profile is for a second OSN that is different from the first OSN. In one or more embodiments, this extraction is similar to extracting profile tokens performed in Step 201 above.

In Step 204, a candidate user is particularly identified from all the candidate users based on the target OSN user profile tokens and at least one of the indexes. In one or more embodiments, this particularly identified candidate user (referred to either specifically as "selected candidate user" or simply as "candidate user" depending on the context) is identified by performing look up of the hash table using at least one of the target OSN user profile tokens. Examples of identifying the selected candidate user are described in reference to FIGS. 3A and 3B below.

In Step 205, a score is calculated to represent a similarity measure between one of the candidate user profiles that belongs to the selected candidate user and the target user profile of the target user. In one or more embodiments, the score is calculated based on comparing the target OSN user profile tokens and a portion of all previously extracted OSN user profile tokens that is associated with the selected candidate user. Further, the comparison is performed based on one of the class, the type, and the length of the tokens. Limiting the score calculation and associated comparison to a subset of all of the extracted OSN user profile tokens by considering the selected candidate user, the class, the type, and the length effectively conserves the computing resources for performing the OSN profile comparison/matching. Examples of calculating the score are described in reference to FIG. 3B below.

In Step 206, in response to the score exceeding a predetermined threshold, a combination of the two compared user profiles are stored as an expanded profile of the target user. Accordingly, the expanded profile is analyzed to generate a personal information report of the target user. Examples of storing the combined user profiles (referred to as splicing the user profiles) and generating the personal information report are described in reference to FIGS. 3A and 3B below.

Figure 3A:
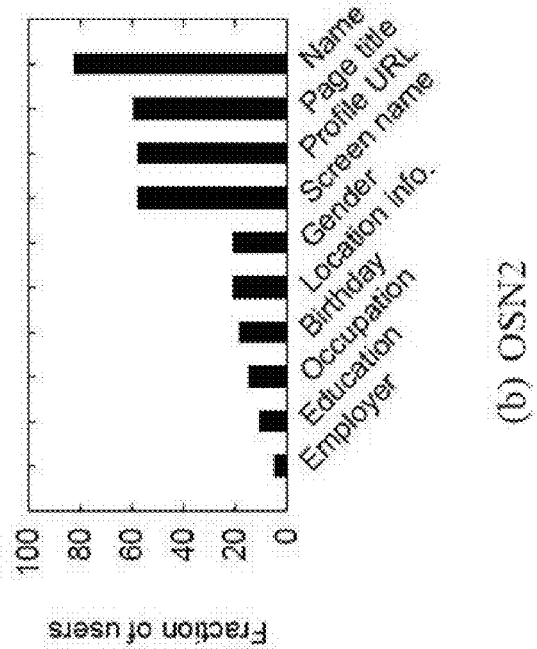
FIGS. 3A and 3B show an application example in accordance with embodiments of the invention.
Figure 3A:
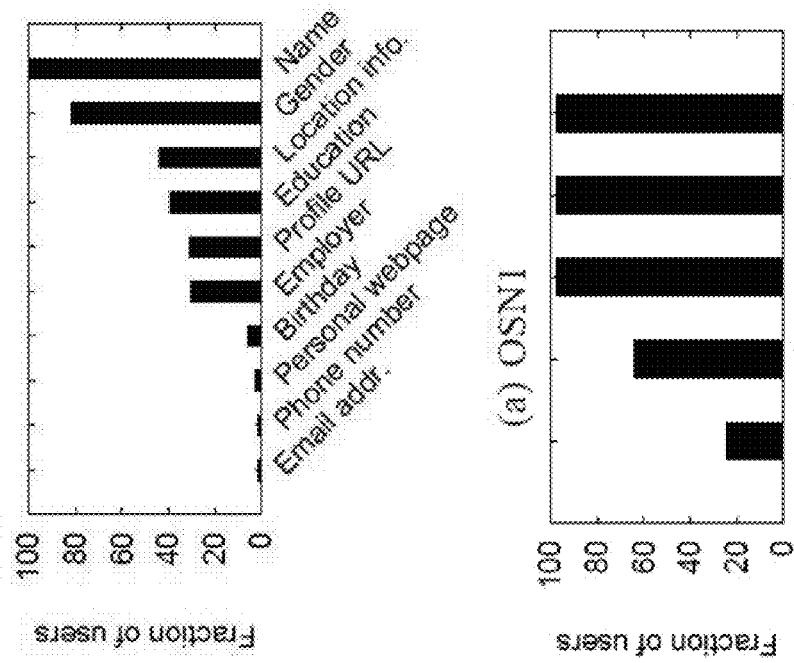
Figure 3B:
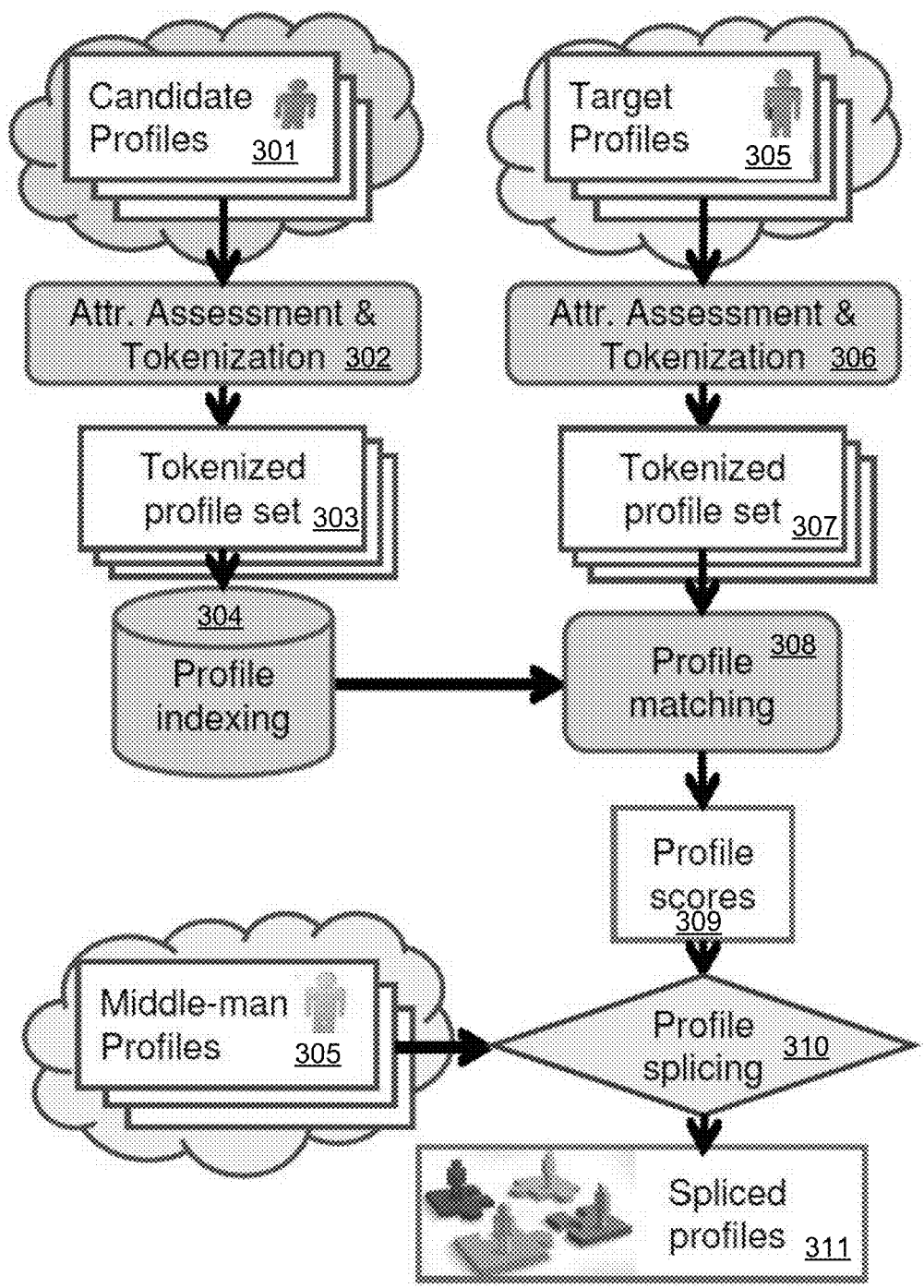

FIGS. 3A and 3B show an application example in accordance with embodiments of the invention. This example application may be practiced using the system (100) of FIG. 1 and based on the method described with respect to FIG. 2 above. FIG. 3A shows the percentage of profile attributes discovered for three example OSNs, namely OSN1, OSN2, and OSN3, respectively. One observation is that many (over 20%-40%) users reveal non-sensitive information (e.g., resident city, hometown, schools, employers, etc.) that can promote local gathering or finding of real-world acquaintances. Very few users, on the other hand, disclose sensitive information, such as phone number, email, and personal webpage. Another observation is that not all attributes equally contribute to joining the profiles. Similarity in account screen names, for example, gives more confidence in joining while similarity in the list of favorite music albums does not.

FIG. 3B shows an example workflow of comparing/matching OSN user profiles of two OSNs referred to as a candidate OSN and a target OSN, which are denoted by $N^c$ and $N^t$, respectively in the discussion below. As shown, the candidate profiles (301) and the tokenized profile set (303) correspond to the OSN A user profile (102a) and tokenized OSN A user profile (106a), respectively in FIG. 1. Similarly, the target profiles (305) and tokenized profile set (307) correspond to the OSN B user profile (102b) and tokenized OSN B user profile (108), respectively in FIG. 1. Further, attribute assessment & tokenization (302) and (306), profile matching (308) and profile splicing (310) are performed by the profile tokenizer (103) and profile matcher (104), respectively in FIG. 1.

Let $P=\{p_i\}$ be a set of profiles of an OSN denoted by N. Let $T(p_i)=\{t(p_{i,j})\}$ be a set of tokenized attributes (or tokens), where a profile $p_i$ may have multiple tokens $t(p_{i,j})$ where $j=1$ through $|T(p_1)|$. A summary of notations is listed in TABLE 1.

TABLE 1

| Notation | Definition |
| --- | --- |
| N | online social network, $N = [N^c|N^t]$. |
| $N^c$ | candidate OSN. |
| $N^t$ | target OSN. |
| $p_i$ | a profile of N. |
| $T(p_i)$ | token set of profile $p_i$. |
| $t(p_i,j)$ | a token j of profile $p_i$. |
| $t_k(p_i)$ | a key token. |
| $t_d(p_i)$ | a derived token. |
| $t_s(p_i)$ | a statistical token. |
| $f_p(p_i^c, p_j^t)$ | Perfect match function. |
| $f_q(p_i^c, p_j^t)$ | Quasi-perfect match function. |
| $f_r(p_i^c, p_j^t)$ | Partial match function. |
| $f_s(p_i^c, p_j^t)$ | Statistical match function. |
| $M(P^c, P^t)$ | matching pairs of $p_i^c, p_j^t$. |

An example algorithm of the profile matching (308) uses four similarity functions $f_p$, $f_q$, $f_r$, and $f_s$, representing perfect match, quasi-perfect match, partial match, and statistical match, respectively that are commonly denoted by "f.". Each function $f.(p_i^c, p_j^t)$ takes candidate profile $p_i^c$ and target profile $p_j^t$ as inputs and outputs a similarity score vector (i.e., profile scores (309)) based on analyzing different aspects of profiles. The objective of the example algorithm is to obtain a collection M of matching profile pairs $(p_i^c, p_j^t)$ where each matching profile pairs has a linear combination of similarity scores of f.( ) that exceeds a threshold $\tau$. This can be represented mathematically as $$M(P^c, P^t) = \{(p_i^c, p_j^t) | \Sigma C \cdot f.(p_i^c, p_j^t) > \tau\}.$$

Each pair of profiles in M that satisfies the above condition are considered as belonging to the same user and combined as one of the spliced profiles (311).

Because different OSN focuses on different aspects of users' OSN activity, the information contained in the user profiles of the different OSNs vary. A semantic analysis on the attributes of profiles may provide a way to compare a pair of heterogeneous profiles from two OSNs $N^c$ and $N^t$ side-by-side. However, the comparison between $p_i^c$ and $p_j^t$ requires significant effort in building an ontology tree to identify semantically equal attributes. In the dynamic Internet environment where the existing services constantly update and new services open up at a dizzying pace, such ontology-based approach can be outdated, error-prone, and costly. As an effort to generalize the attributes of profiles from across different OSNs and to use a generic set of algorithms to compare them, an approach that uses minimal amount of OSN specific knowledge is used. For example, attribute assessment & tokenization (302) and (306) categorize attributes into the following three different classes to allow flexible matching between attributes within a class, as opposed to generating a class for each attribute and imposing a restrictive attribute-by-attribute matching.

1. Key Attribute Class.

This class of profile attributes uniquely identifies an online user from others. An attribute is considered as a key attribute when only a few users, if not one person, share the same attribute. Examples of such attributes include user ID, user name, email address, and phone number. Exact matches between the attributes in this class allow direct associations of profiles from different OSNs with highest confidence.

2. Derivable Attribute Class.

This class of attributes is used in deriving new attributes and perform partial match of profiles. A pair of email addresses, for example, looseturkey@gmail.com and looseturkey80@blogspot.com have some likelihood of belonging to the same person, specially if the two associated profiles also additionally have e.g., year of birth as 1980. Derivable attribute class includes attributes that provide ways to realize such partial comparison. The derivable attributes include birth days, street names of address, email handles (as in <handle>@<domain.com>}, etc.

3. Statistical Attribute Class.

This class of profile attribute can relate profiles by stochastic matching. While this class of attributes is not sufficient to uniquely identify a person, it can add confidence to true match or reject false match when the other classes of attributes cannot provide a clear decision. Birth day, gender, marital status, schools attended, employers, and city of residence are example attributes.

It is not always clear which attribute belongs to which class. Take birth year of 1980 for instance, it functions as a derivable attribute because it can be a part of email handle (e.g., looseturnkey80). At the same time, it can function as a statistical attribute because it separates the profile from other users not born in 1980. For this reason, soft clustering approach is used to label a single attribute into multiple categories in case its class membership is ambiguous. Classifications of the attributes of three example OSN profile sets based on FIG. 3A are summarized in TABLE 2 where "K" stands for Key attribute, "D" stands for Derivable attribute and "S" stands for Statistical attribute. The letter in each cell indicates the class of corresponding attribute; empty cells represent unavailable attribute in the corresponding OSN.

TABLE 2

| Attributes | OSN 1 | OSN 2 | OSN 3 |
|---|---|---|---|
| OSN ID | K | K | K |
| Name | K | K | K |
| Screen name |  | K | K |
| Email addr. | K |  |  |
| Phone number | K |  |  |
| Profile URL | K | K | K |
| Page title |  | K |  |
| Personal webpage | D |  | D |
| Birthday | D, S | D, S |  |
| Employer | D, S | D, S |  |
| Occupation |  | D, S |  |
| Education | D, S | D, S |  |
| Location info. | D, S | D, S | D, S |
| Gender | S | S |  |

In order to perform an efficient comparison between profiles, attributes of profiles are tokenized into meaningful units. As opposed to n-gram based character-wise tokenization, attribute values are separated into alphabetic tokens and numeric tokens, which are treated as atomic tokens without any further tokenization. These alphabetic tokens and numeric tokens serve as the fundamental unit in the profile similarity assessment. In the atomic token creation process, symbols and special characters are used as separators (i.e., de-limiters). Each atomic token falls into one of the three categories of key token, derived token, and statistical token based on TABLE 2. The atomic tokenization allows computationally efficient exact match to be performed between tokens instead of computationally expensive soft, partial string matches.

1. Key Tokens.

Key tokens $t_k(p_i)$ for profile $p_i$ are obtained from the key attributes, where a single symbol or multiple consecutive symbols (i.e., special characters) are replaced by a single symbol signifier ".". For an exemplary screen name "Marcy**Walker80", the key token is recorded as $t_k(p_i)$=marcy.walker.80 as a single atomic token. By preserving the ordering of alphabetic, numeric, and special characters in the attribute string, the forthcoming profile similarity measurement retains the structural information crucial to perfect matching $f_p(\ )$. Also by generalizing separator format, matching algorithm can match a pair of tokens while accepting slight difference in their presentation (e.g., use of different symbols between terms).

2. Derived Tokens.

Derived tokens $t_d(p_i)$ are created from key and derivable attribute classes by separating alphabetic and numeric parts. In case of a key attribute, if the set of derived tokens $T_d(p_i)$ from a pair of profiles have significant overlap, they may be compared by partial matching schemes (i.e., quasi-perfect matching $f_q(\ )$ and partial-matching $f_p(\ )$). In the example of screen name "Marcy**Walker80", three tokens of $T_d(p_i)$ ={marcy, walker, 80} are extracted. Note that the key token is a concatenation of derived tokens with the original order preserved but symbol(s) replaced by the signifier ".".

3. Statistical Tokens.

Statistical tokens $t_s(p_i)$ are extracted from statistical attribute class. The statistical tokens are reserved to be used when both key token and derived token comparisons could not yield any positive relation. While the statistical tokens are by no means unique, if two profiles match on one or more of the statistical tokens, further comparisons focus on a smaller subsets of candidate profiles than the entire population of $P^c$ (i.e., $|P^c|$).

The statistical tokens are usually generalizable into a single format for comparison across different profile formats. Gender, for example, is tokenized into numerical values ranging from 0 to 3, representing "not available", "male", "female", "both", respectively. Information with geographic location (e.g., resident city, state) is translated into their representative zip-codes to avoid string match.

Domain knowledge may be used to add intelligence into tokenization. In order to maximize the probability of the partial matches, domain knowledge is used as supplemental information. In case of a date (e.g., a birth date "Mar. 6, 1980"), most popular variants of the tokens are generated into derived token set td(pi)={march, mar, 3, 6th, 6, 1980, 80}. User full name is also used as domain knowledge. Here, with the help of a name-abbreviation conversion table, the first character and the abbreviated form of the name, along with the full first and last name are associated. Following the method, user name "William Valentine" is derived into derived token set td(pi)={w, william, b, bill, v, valentine'}. Additional domain knowledge examples are listed in TABLE 3 below. In particular, name abbreviation [1, 15] refers to pre-determined database of equivalent names and name abbreviations. Further, keyword of profile URL is extracted based on the domain knowledge parsing rule, which strips "scheme://domain:port" portion of absolute URLs and extract the fragment identifier portion of the remaining paths. From a URL "http://pro.imdb.com/name/ab1234" with the format of "scheme://domain/path/sub-path", for example, the URL extraction rule takes the sub-path of the URL, "ab1234", that corresponds to the identifier of a profile into its derived token set. In this context, the formatting of URL into "scheme://domain/path/sub-path" is referred to as the domain knowledge. In summary, if an OSN user profile attribute or extracted token is related to a person's name and/or date/time, semantically equivalent tokens are identified based on the domain knowledge regarding name and date/time format. If an OSN user profile attribute or extracted token is related to a screen name, phone number, or URL, derived tokens are extracted based on the domain knowledge regarding screen name, phone number, or URL format.

TABLE 3

| Attribute | Derived Token Set |
|---|---|
| Full Name | First character, name abbreviation [1, 15] plus full first and last names. E.g. "William Valentine", is derived into {"w", "william", "b", "bill", "v", "valentine"}. |
| Screen Name | Alphabetic and numeric tokens separated by symbols and special characters. E.g. "===Marcy**Walker80===", is derived into {"marcy", "walker", "80"} |
| Date | Full month, three characters month abbreviation, numeric month, day, full four digit year, and last two digit of year. E.g. "March 6th, 1980", is derived into {"march", "mar", "3", "6", "1980", "80"}. |
| Phone Number | Full phone number, area code, and last four digits. E.g. (123)-456-6789 is derived into {123, 6789, 1234566789} |
| Profile URL | Keyword of a profile URL. E.g. "http://pro.imdb.com/name/ab1234" is derived into {"ab1234"} |

Scalability of user profile matching may be improved by fine-grained token binning. A brute force matching by pair-wise comparison between all tokens of all $P^c$ and $P^t$ will result in a prohibitive amount of comparisons even for exact string matches, considering average 24 tokens per user and 11,974 users in a common OSN. Since the match only conducts exact token string comparisons (as opposed to soft, partial string match), comparing tokens with different length can be excluded. Therefore, computation resource can be conserved by only comparing tokens with same length and character set type (e.g., alphabetic or numeric). In particular, multiple t(p) are grouped based on same length and same type. TABLE 4 shows groupings of example tokens listed in TABLE 3.

TABLE 4

| Charset type | length | Token bin |
|---|---|---|
| Alphabetic | 1 | b, w. v |
|  | 3 | mar |
|  | 4 | bill |
|  | 5 | march, marcy |
| Numeric | 1 | 3.6 |
|  | 3 | 123 |
|  | 4 | 1980, 6789 |

Experiments based on example data sets show that this scheme saved 70% of comparisons compared to the brute force way by pair-wise comparison between all tokens of all $P^c$ and $P^t$. This saved not only the computation time but the memory footprint of tokens, adding scalability in handling large-scale datasets.

When matching two profiles by comparing the tokens from them, non-contextual and blind comparison may lead to poor matching accuracy. For example, a comparison between user names, "Mary" and "Mark", are considered very similar under edit distance measure. As noted above, profile strings are tokenized into semantic maintaining atomic tokens so that exact token string comparisons are performed in the profile matching process. This promotes the efficiency of token sets comparison. Given a number of profiles in $N^c$, the profile comparison between multiple pairs between $P^c$ and $P^t$ requires O(|$P^t$| to the power of |$P^c$|) comparisons if it is done in the brute force, all-pair comparison method. To efficiently compare only a selected subset of profiles, the profile indexing (304) is performed, which is a token indexing scheme using a hash table and is described below.

The four profile similarity scoring functions described above are designed to take token sets (of a profile) as input, not the profiles. If a pair of profiles being compared do not share any commonality in their tokens, it is not necessary to compare them as the scoring functions will univocally return scores of 0s. Based on this observation, tokens of candidate profiles are indexed in a way to reduce/eliminate unnecessary comparisons. In order to uniquely identify a user, OSNs issue profile identifier (either in numeric or alpha-numeric string) to every profile. For each OSN two token hash tables are created, one for key tokens $T_k(p)$ from all candidate profiles $P^c$, and another one for derived tokens $T_d(p)$ from all candidate profiles $P^c$. The tokens are hashed into their respective hash tables such that their hash table keys are token values and hash table values are lists of profile IDs associated to the token. In the query stage, the hash table is queried with a target token to obtain a list of candidate profile IDs that are associated to the token value. If two profiles' token sets do not have any token in common, similarity scores do not need to be calculated for these two profiles. Without candidate profile pruning, a target profile in an example data set has to be compared with all 11,974 candidate profiles. After pruning, the target profile only has to compare with 143 candidate profiles on average, saving 98.8% of profile comparisons in the example OSN profile comparison experiment.

In the profile matching (308), the similarity of a candidate profile $p^c$ in $N^c$ is compared with target profile $p^t$ in $N^t$ through the aforementioned four different scoring functions of perfect match, quasi-perfect match, partial match, and statistical match functions, each focusing on capturing different aspects of true identities behind various OSN profiles. Tokens matched between profiles may be weighted using the commonly used Inverse Document Frequency (IDF) weights:

$$\omega(t) = \log \frac{|P|}{|\{P'\} : t \in P'|}$$

where P is the entire set of profiles and P' is a subset of profiles that contain token t. Each of these matching functions generates a particular similarity measure between the candidate profile $p^c$ in $N^c$ and the target profile $p^t$ in $N^t$. All similarity measures generated by these matching functions are collectively referred to as the profile scores (309), which are described in detail below.

1. Perfect Match.

Perfect match looks for the exact match between entire strings of candidate profile attributes and target profile attributes. Thus, in this matching, the key tokens of a profile $p^c$ (i.e., $t_k(p^c, \bullet)$) are compared against the key tokens of a profile $p^t$ (i.e., $t_k(p^t, \bullet)$). Perfect match score $S_p$ is defined as below to be the number of key tokens shared by two profiles' key token sets, normalized by the token's frequency.

$$S_p(p^c, p^t) = \sum_{T \in T_k(p^c, \cdot) \cap T_k(p^t, \cdot)} \omega(T).$$

2. Quasi-Perfect Match.

The idea behind matching derived to key tokens is to assess the possibility of constructing a key token of a target profile using partial, derived tokens from a candidate profile. First, the set of derived tokens $t_d(p^c, \cdot)$ of a candidate profile is matched against the set of key tokens $t_k(p^t, \cdot)$ from a target profile. Because a key token $t_k(p^t, i)$ can have n atomic segments (either alphabetic or numeric), these derived tokens are matched with $t_d(p^c, \cdot)$. For example, let $t_k(p^t, i)=$ "bill.89.penn" with three atomic segments. If $p^c$ has user name "William", birthday in "1989", and attended a school in Pennsylvania, and thus its derived atomic token set $t_d(p^c, \cdot) = \{w, bill, william, 1989, 89, pa, penn, Pennsylvania\}$, $p^t$ and $p^c$ can be matched from the quasi-perfect match by matching $t_k(p^t, i)$ to any three of the eight tokens in $t_d(p^c, \cdot)$.

To conserve computation resources, only alphabetic segments of a key token need to be matched with an alphabetic derived token with the same length (i.e., same number of characters). Similarly, only numeric segments of a key token need to be matched with a numeric derived token. Thus, in real application, "bill" in $t_k(p^t, i)$ only gets to be compared with (w, bill, william, pa, penn, Pennsylvania) in $t_d(p^c, \cdot)$.

Let $\hat{T}_k(p^t, i)$ be the set of atomic segments of $t_k(p^t, i)$, quasi-perfect match score for a single target key token $t_k(p^t, i)$ is computed as $$\frac{\sum_{T \in \{\hat{T}_k(p^t, i) \cap T_d(p^c, i)\}} \omega(T)}{\sum_{T \in \{\hat{T}_k(p^t, i)\}} \omega(T)}.$$

After comparing all $t_d(p^c, \cdot)$ against $t_k(p^t, \cdot)$ (i.e., derived-to-key match), all to match key tokens from both target and candidate set. The quasi-perfect match score $S_q$ is computed as below.

$$S_q(p^c, p^t) = \sum_{i=1}^{|T_k(p^t, \cdot)|} \left( \frac{\sum_{T \in \{\hat{T}_k(p^t, i) \cap T_d(p^c, i)\}} \omega(T)}{\sum_{T \in \{\hat{T}_k(p^t, i)\}} \omega(T)} \right) + \sum_{i=1}^{|T_k(p^t, \cdot)|} \left( \frac{\sum_{T \in \{\hat{T}_k(p^c, i) \cap T_d(p^t, i)\}} \omega(T)}{\sum_{T \in \{\hat{T}_k(p^c, i)\}} \omega(T)} \right)$$

3. Partial Match

Despite the name, partial string comparison is not performed in partial match (or in any other match). Instead, exact string match is performed between atomic tokens, which are parts of attributes, hence the name. Even if two profiles $p^c$ and $p^t$ belongs to a single person, the tokens inside them may not perfectly match. Partial match searches for slightest overlap between meaningful units of profiles by performing all possible comparisons between atomic and derived tokens of $p^c$ and $p^t$. The Partial match score $S_r$ counts the number of derived tokens shared between the two profiles' derived token sets, and gets normalized by the size of derived token sets in comparison. The possibility of applying locality sensitive hashing in the score estimation allows computationally lighter construction of the score as the equation below.

$$S_r(p^c, p^t) = \frac{\sum_{T \in t_d(p^c, i) \cap t_d(p^t, \cdot)} \omega(T)}{\sum_{T \in t_d(p^c, \cdot) \cap t_d(p^t, \cdot)} \omega(T)}$$

4. Statistical Match.

As a reinforcement to the matching scores obtained from the above schemes, the match between the statistical tokens, $t_s(p^c, i)$ and $t_s(p^t, i)$ provides an added level of confidence. The scoring for matching two statistical tokens is provided by a probability based on the amount of ties in the entire observation. Take gender for example. Even if $p^c$ and $p^t$ are both female, the probability of the match has to be denominated by the amount of total female population. Let $\bar{t}_s$ be a predicate for equivalence between $t_s(p^c, i)$ and $t_s(p^t, i)$, $$\bar{t}_s(p^c, p^t, i) = \begin{cases} 1 & \text{if } t_s(p^c, i) = t_s(p^t, i) \\ 0 & \text{otherwise} \end{cases}.$$

Because the statistical score $S_s(p^c, p^t)$ should be proportional to the rarity of a positive match, it is set to be complementary to the match probability such that $$S_s(p^c, p^t) = \sum_{i=1}^{|t_s(p^c, \cdot)|} 1 - \frac{\bar{t}_s(p^c, p^t, i)}{t_s(p, i)}.$$

Devising different scoring functions is motivated by the fact that a single function cannot capture similarities of all possible profile pairs. TABLE 5 demonstrates it by showing the amounts of ground truth pairs identified by each scoring function. Although functions may capture same pairs and create overlaps, taking the union of them generates the largest coverage.

TABLE 5

| OSN pair | Can be matched (%) | | | |
| --- | --- | --- | --- | --- |
|  | $f_n()$ | $f_q()$ | $f_r()$ | $f_s()$ |
| OSN1 vs. OSN2 | 13.3 | 22.6 | 23.9 | 6.3 |
| OSN1 vs. OSN3 | 17.7 | 26.8 | 29.7 | 15.9 |
| OSN2 vs. OSN3 | 23.5 | 40.8 | 40.8 | 4.1 |

Once the similarity scores (i.e., the profile scores (309)) are computed, OSN profiles of a user can be joined in the profile splicing (310) step based on the scores. Since all three types of scores deliver different semantics and have different ranges of values, thresholds are separately identified for determining the positive match. The application of thresholds for each of the score leads to the understanding of the dynamics of scores such as the significance and sensitivity of the scoring functions. Among many schemes available for decision making, a regression scheme may be used. Because the three scores have variable range of values based on the tokens they process, it is difficult to apply decision schemes that bases on the absolute value of scores (i.e., majority voting). Regression, on the other hand, provides an objective way to fit the thresholds to the data set irrespective of the scale of values. To prevent over-fitting due to an over-constrained system (i.e., the equation has far smaller number of unknowns than the number of equations $(3 \ll |P^c|*|P^t|))$, Ridge regression, known to those skilled in the art, may be used that imposes a penalty term λ, on the complexity of model and minimize the penalized residual sum of squares (RSS).

An example data set is split into training and testing set: out of the total users from each OSN, a random half is chosen as training set and the other half as testing set. Let X be an input matrix with pairs of candidate and target profiles from the training set on the rows and the three scores $S_p$, $S_q$, and $S_r$ on the column. Let y be an observation vector with the ground truth matches annotated as 1s. The Ridge coefficient vector β can be computed by $$\beta = (X^T X + \lambda I)^{-1} X^T y$$

where I is the identity matrix.

The components of vector β are thus the three coefficients for scores of $S_p$, $S_q$, and $S_r$, and a linear combination of these scores present a threshold τ. Applying τ to the testing set of $P^c$ and $P^t$, a subset of $P^c$ and $P^t$ is obtained that contains composite user profiles referred to as the spliced profiles (311).

As noted above, different OSNs have their own purpose and can only cover a part of a user's social life. For example, a personal information oriented OSN 1 user may provide her entire educational experience (e.g., from elementary school to college) on her profile page to help her finding old classmates. But this same user may only want to put the highest education on her professional profile of professional information oriented OSN 2, rendering pair-wise comparison to result in a score close to 0. These seemingly dissimilar profiles of two OSNs may be matched by adding auxiliary information of a third OSN 3, referred to as gaining the help of middle-man profiles (305). While the example is described with only one additional OSN, those skilled in the art, with the benefit of this disclosure, will appreciate that the application of middle-man's help can be applied with auxiliary information from multiple OSNs.

TABLE 6 shows user profiles P1 and P2 of a single user that are obtained from OSN 1 and OSN 2, respectively. In particular, the OSN profile attributes include screen name, employer name, user name, email address, home town, zodiac information, school, personal website, birthday, etc.

TABLE 6

| | |
|---|---|
| $p_1$ | {Screen name: ninja78}, {Employer: Pz Hospital} |
| $p_2$ | {Name: Bob Tween}, {MSN: looseturkey@msn.com}, {Hometown: Olympia, WA}, {Zodiac: Aquarius} |

As can be seen from these example user profiles, no relationship could be inferred about P1 and P2. Continuing the above case, this user's profile P3 from OSN 3 contains information that helps matching P1 and P2 either as a bridge or as an enhancer.

TABLE 7 shows an example of P3 for the first case of bridging.

TABLE 7

| | |
|---|---|
| $p_3$ | {Screen name: ChristmasCarol}, {School: Rutgers University}, {My sites: OSN1 .com/blog/looseturkey, OSN2 .com/ninja-photo-gallery} |

Here, P3 can be strongly connected to both P1 and P2 when the URL provided in his profile gets parsed. Specifically, "looseturkey" matches P2's MSN handle (captured by perfect match), and "ninja-photo-gallery" matches P1's screen name by token "ninja" which earns relatively high weight by being more unique than the subsequent tokens of "photo" and "gallery" in quasi-perfect match.

TABLE 8 shows an example of P3 for the second case of enhancing.

TABLE 8

| | |
|---|---|
| $p_3$ | {Name: Tween}, {Scr_name: ninja}, {B-day: 01/25/78}, {From: WA} |

Here, P3 makes a high confidence match with P1. Specifically, the similarity of the screen name attributes measured by $f_q(t_d(P1, \text{ninja78}), t_k(P3, \text{ninja}))$ and the similarity of birth years measured by $f_r(t_d(P2, \text{ninja78}), t_d(P3, 01/25/78))$ are both high. By joining these two profiles P1 and P3 as P1,3, it holds more complete information on the true identity as shown in TABLE 9.

TABLE 9

| | |
|---|---|
| $p_{1,3}$ | {Name: Tween}, {Screen name: ninja, ninja78}, {Birthday: 01/25/78}, {From: WA}, {Employer: Pz Hospital} |

Matching P1,3 against P2, following tokens overlaps: {Tween, 25, Olympia, Wash., Aquarius—January 25}. In both cases, the middle man, P3, associates the seemingly irrelevant profiles.

Table 10 provides all tokens of P1, P2, P3 as a bridge, and P3 as an enhancer, supplemented by domain knowledge and categorized by token type and length.

TABLE 10

| Token types | Character Length | P1 | P2 | P3 as bridge (first case) | P3 as enhancer (second case) |
|---|---|---|---|---|---|
| Key tokens | | ninja.78 | bob.tween, looseturnkey | christmas.carol | tween, ninja |
| Alphabetical derived tokens | 1 | | b, r, t | | t |
| | 2 | pz | wa | | wa |
| | 3 | | Bob | | Jan |
| | 5 | ninja | tween | carol, ninja, photo | tween, ninja |
| | 6 | | Robert | | |
| | 7 | | olympia, msn.com | rutgers, gallery | january |
| | 8 | hospital | aquarius | | |
| | 9 | | | christmas | |
| | 10 | | washington | university | washington |
| | 12 | | looseturnkey | looseturnkey | |
| Numerical derived tokens | 2 | 78 | | | 01, 25, 78 |
| | 4 | 1978 | | | 1978 |

The middle-man's help can be formally formulated as below. Let $N^c$, $N^t$, and $N^m$, represent the candidate OSN, the target OSN, and the middle-man OSN, respectively. Also let τ represent the threshold for the scoring functions. Define an evaluation function $\text{Eval}(p^t, p^c, \tau)$, where if two profiles $p^t$ and $p^c$ are similar, the linear combination of three scores ($S_p$, $S_q$, $S_r$)>=τ and $\text{Eval}(p^t, p^c, \tau)=1$; on the contrary, if the linear combination of the three scores ($S_r$, $S_q$, $S_r$)<τ, then $\text{Eval}(p^t, p^c, \tau)=0$. Accordingly, the two scenarios of using middle-man's help is formally described as below:

1. As a Bridge.

Suppose $\text{Eval}(p^t, p^c, \tau)=0$, $\text{Eval}(p^t, p^m, \tau)=1$, and $\text{Eval}(p^c, p^m, \tau)=1$. Because profile similarity is transitive, $\text{Eval}(p^t, p^c, \tau)$ is over-written to 1 to indicate that $p^t$ and $p^c$ belong to the same user.

2. As an Enhancer.

Suppose $\text{Eval}(p^t, p^c, \tau)=0$, $\text{Eval}(p^t, p^m, \tau)=1$, and $\text{Eval}(p^c, p^m, \tau)=0$. But the merged profile by $p^t$ and $p^m$, denoted by $p^t \cup p^m$, is similar to $p^c$, denoted by $Eval(p^t \cup p^m, p^c, \tau)=1$, $Eval(p^t, p^c, \tau)$ is over-written to 1 to indicate that $p^t$ and $p^c$ belong to the same user.

Given two users $p^t$ and $p^c$ to be compared, if the evaluation on their similarity scores is greater than $\tau$, then $p^t$ and $p^c$ can be spliced. Otherwise, every profile from a middle-man OSN is evaluated to determine if it can serve as a bridge or an enhancer, in which case $p^t$ and $p^c$ can be spliced. If all the above matching attempts fail, $p^t$ and $p^c$ are not spliced more evidences can be discovered to indicate otherwise.

Figure 4:
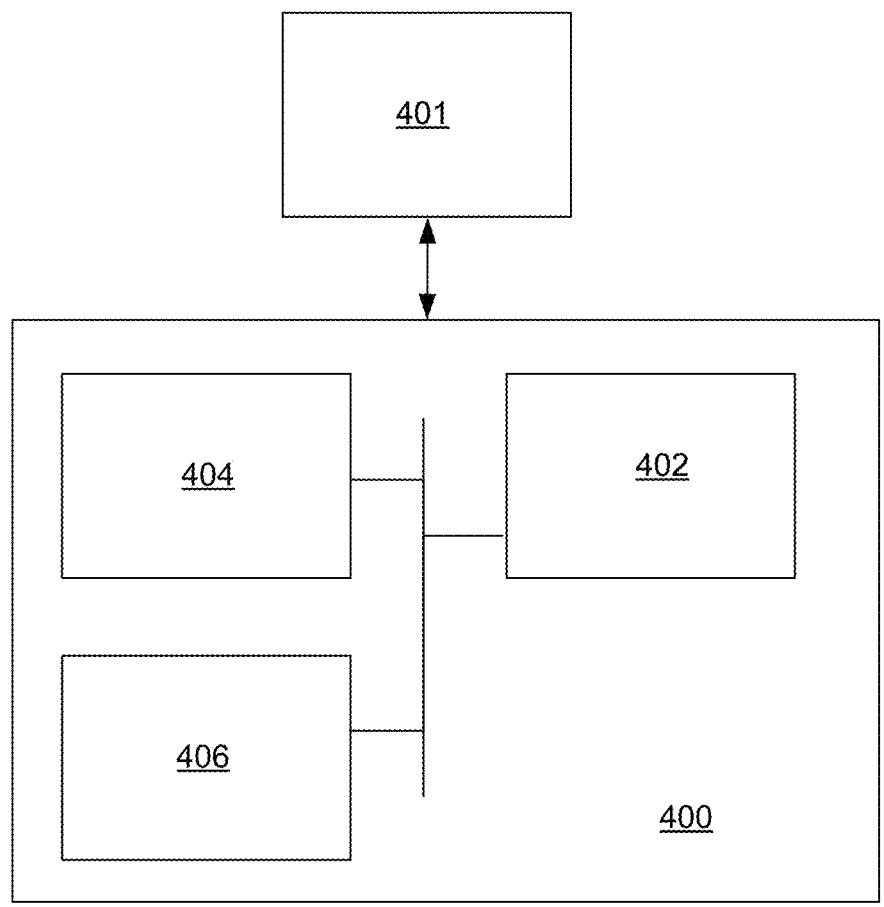
FIG. 4 shows a computer system according to aspects of the invention.

Embodiments of the invention may be implemented on virtually any type of computer regardless of the platform being used. For example, as shown in FIG. 4, a computer system (400) includes one or more processor(s) (402), associated memory (404) (e.g., random document access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor) for example to display various results such as the feature vectors, the principal components, the application space, the signatures, etc. The computer system (400) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., various modules of FIG. 1) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for matching multiple user profiles from separate online social networks (OSNs), comprising:

extracting target OSN user profile tokens from a target OSN user profile of a target user, wherein the target OSN user profile belongs to the target user in a first OSN of the plurality of OSNs, wherein extracting the target OSN user profile tokens from the target OSN user profile comprises:

retrieving a target OSN user profile entry from the target OSN user profile;

generating a target OSN user profile key token from the target OSN user profile entry based on a first sequence of alphanumeric characters in the target OSN user profile entry; and generating a target OSN user profile derived token from the target OSN user profile key token based on a first segment of the first sequence, wherein the first segment is delimited within the target OSN user profile entry using a set of pre-determined special characters, wherein the target OSN user profile tokens comprise the target OSN user profile key token and target OSN user profile derived token;

extracting candidate OSN user profile tokens from a candidate OSN user profile of a candidate user, wherein the candidate OSN user profile belongs to the candidate user in a second OSN of the plurality of OSNs, wherein extracting the candidate OSN user profile tokens from the candidate OSN user profile comprises:

retrieving a candidate OSN user profile entry from the candidate OSN user profile;

generating a candidate OSN user profile key token from the candidate OSN user profile entry based on a second sequence of alphanumeric characters in the candidate OSN user profile entry; and generating a candidate OSN user profile derived token from the candidate OSN user profile key token based on a second segment of the second sequence, wherein the second segment is delimited within the candidate OSN user profile entry using the set of pre-determined special characters, wherein the candidate OSN user profile tokens comprise the candidate OSN user profile key token and candidate OSN user profile derived token;

calculating, by the computer processor, a first similarity measure between the candidate OSN user profile and the target OSN user profile based on a first tally of a plurality of key tokens shared by the candidate OSN user profile tokens and the target OSN user profile tokens;

calculating, by a computer processor, a second similarity measure between the candidate OSN user profile and the target OSN user profile based on a second tally of a plurality of derived tokens shared by the candidate OSN user profile tokens and the target OSN user profile tokens;

aggregating, based on a pre-determined formula, the first similarity measure and the second similarity measure to generate a score;

determining, in response to the score exceeding a pre-determined threshold, the target user and the candidate user as a single person; and combining, in response to at least the score exceeding the pre-determined threshold, the multiple user profiles from the separate OSNs for storing as an expanded profile of the single person, wherein the multiple user profiles comprise the target OSN user profile and the candidate OSN user profile, wherein the separate OSNs comprise the first OSN and the second OSN.

2. The method of claim 1, further comprising:

analyzing the expanded profile to generate a personal information report of the target user.

3. The method of claim 1, further comprising:
- selectively augmenting the target OSN user profile tokens with a semantically equivalent addition; and
- storing the target OSN user profile tokens with the semantically equivalent addition in a data structure that is partitioned based on the plurality of users.

4. The method of claim 3,
- wherein the data structure is further partitioned based on at least one selected from a group consisting of a class, a type, and a length of the target OSN user profile tokens,
- wherein the class comprises a key attribute class where the target OSN user profile key token belongs, a derivable attribute class where the target OSN user profile derived token belongs, and a statistical attribute class, and
- wherein the type comprises an alphabetic type and a numeric type.

5. The method of claim 4,
- wherein the first tally and the second tally are generated using the data structure based on at least one of the class, the type, and the length.

6. A system for matching multiple user profiles from separate online social networks (OSNs), comprising:
- a processor;
- a profile tokenizer executing on the processor and configured to:
  - extract target OSN user profile tokens from a target OSN user profile of a target user, wherein the target OSN user profile belongs to the target user in a first OSN of the plurality of OSNs, wherein extracting the target OSN user profile tokens from the target OSN user profile comprises:
    - retrieving a target OSN user profile entry from the target OSN user profile;
    - generating a target OSN user profile key token from the target OSN user profile entry based on a first sequence of alphanumeric characters in the target OSN user profile entry; and
    - generating a target OSN user profile derived token from the target OSN user profile key token based on a first segment of the first sequence wherein the first segment is delimited within the target OSN user profile entry using a set of pre-determined special characters,
    - wherein the target OSN user profile tokens comprise the target OSN user profile key token and target OSN user profile derived token;
  - extract candidate OSN user profile tokens from a candidate OSN user profile of a candidate user, wherein the candidate OSN user profile belongs to the candidate user in a second OSN of the plurality of OSNs, wherein extracting the candidate OSN user profile tokens from the candidate OSN user profile comprises:
    - retrieving a candidate OSN user profile entry from the candidate OSN user profile;
    - generating a candidate OSN user profile key token from the candidate OSN user profile entry based on a second sequence of alphanumeric characters in the candidate OSN user profile entry; and
    - generating a candidate OSN user profile derived token from the candidate OSN user profile key token based on a second segment of the second sequence, wherein the second segment is delimited within the candidate OSN user profile entry using the set of pre-determined special characters,
    - wherein the candidate OSN user profile tokens comprise the candidate OSN user profile key token and candidate OSN user profile derived token; and
- a profiler matcher executing on the processor and configured to:
  - calculate a first similarity measure between the candidate OSN user profile and the target OSN user profile based on a first tally of a plurality of key tokens shared by the candidate OSN user profile tokens and the target OSN user profile tokens;
  - calculate a second similarity measure between the candidate OSN user profile and the target OSN user profile based on a second tally of a plurality of derived tokens shared by the candidate OSN user profile tokens and the target OSN user profile tokens;
  - aggregate, based on a pre-determined formula, the first similarity measure and the second similarity measure to generate a score;
  - determine, in response to the score exceeding a pre-determined threshold, the target user and the candidate user as a single person; and
  - combine, in response to at least the score exceeding the pre-determined threshold, the multiple user profiles from the separate OSNs for storing as an expanded profile of the single person, wherein the multiple user profiles comprise the target OSN user profile and the candidate OSN user profile, wherein the separate OSNs comprise the first OSN and the second OSN.

7. The system of claim 6,
- wherein the system further comprises a personal information analyzer configured to:
  - analyze the expanded profile to generate a personal information report of the target user.

8. The system of claim 6, wherein the profile tokenizer is further configured to:
- selectively augment the target OSN user profile tokens with a semantically equivalent addition; and
- store the target OSN user profile tokens with the semantically equivalent addition in a data structure that is partitioned based on the plurality of candidate users.

9. The system of claim 8,
- wherein the data structure is further partitioned based on at least one selected from a group consisting of a class, a type, and a length of the target OSN user profile tokens,
- wherein the class comprises a key attribute class where the target OSN user profile key token belongs, a derivable attribute class where the target OSN user profile derived token belongs, and a statistical attribute class, and
- wherein the type comprises an alphabetic type and a numeric type.

10. The system of claim 9,
- wherein the first tally and the second tally are generated using the data structure based on at least one of the class, the type, and the length.

11. A non-transitory computer readable medium embodying instructions for matching multiple user profiles from separate online social networks (OSNs), the instructions when executed by a processor comprising functionality for:
- extracting target OSN user profile tokens from a target OSN user profile of a target user, wherein the target OSN user profile belongs to the target user in a first OSN of the plurality of OSNs, wherein extracting the target OSN user profile tokens from the target OSN user profile comprises:
  - retrieving a target OSN user profile entry from the target OSN user profile;

generating a target OSN user profile key token from the target OSN user profile entry based on a first sequence of alphanumeric characters in the target OSN user profile entry; and generating a target OSN user profile derived token from the target OSN user profile key token based on a first segment of the first sequence wherein the first segment is delimited within the target OSN user profile entry using a set of pre-determined special characters, wherein the target OSN user profile tokens comprise the target OSN user profile key token and target OSN user profile derived token;

extracting candidate OSN user profile tokens from a candidate OSN user profile of a candidate user, wherein the candidate OSN user profile belongs to the candidate user in a second OSN of the plurality of OSNs, wherein extracting the candidate OSN user profile tokens from the candidate OSN user profile comprises:

retrieving a candidate OSN user profile entry from the candidate OSN user profile;

generating a candidate OSN user profile key token from the candidate OSN user profile entry based on a second sequence of alphanumeric characters in the candidate OSN user profile entry; and generating a candidate OSN user profile derived token from the candidate OSN user profile key token based on a second segment of the second sequence, wherein the second segment is delimited within the candidate OSN user profile entry using the set of pre-determined special characters, wherein the candidate OSN user profile tokens comprise the candidate OSN user profile key token and candidate OSN user profile derived token;

calculating a first similarity measure between the candidate OSN user profile and the target OSN user profile based on a first tally of a plurality of key tokens shared by the candidate OSN user profile tokens and the target OSN user profile tokens;

calculating a second similarity measure between the candidate OSN user profile and the target OSN user profile based on a second tally of a plurality of derived tokens shared by the candidate OSN user profile tokens and the target OSN user profile tokens;

aggregating, based on a pre-determined formula, the first similarity measure and the second similarity measure to generate a score;

determining, in response to the score exceeding a pre-determined threshold, the target user and the candidate user as a single person; and combining, in response to at least the score exceeding the pre-determined threshold, the multiple user profiles from the separate OSNs for storing as an expanded profile of the single person, wherein the multiple user profiles comprise the target OSN user profile and the candidate OSN user profile, wherein the separate OSNs comprise the first OSN and the second OSN.

12. The non-transitory computer readable medium of claim 11, the instructions when executed by the processor further comprising functionality for:

analyzing the expanded profile to generate a personal information report of the target user.

13. The non-transitory computer readable medium of claim 11, the instructions when executed by the processor further comprising functionality for:

selectively augmenting the target OSN user profile tokens with a semantically equivalent addition; and storing the target OSN user profile tokens with the semantically equivalent addition in a data structure that is partitioned based on the plurality of users.

14. The non-transitory computer readable medium of claim 13, wherein the data structure is further partitioned based on at least one selected from a group consisting of a class, a type, and a length of the target OSN user profile tokens, wherein the class comprises a key attribute class where the target OSN user profile key token belongs, a derivable attribute class where the target OSN user profile derived token belongs, and a statistical attribute class, and wherein the type comprises an alphabetic type and a numeric type.

15. The non-transitory computer readable medium of claim 14, wherein the first tally and the second tally are generated using the data structure based on at least one of the class, the type, and the length.

* * * * *